Figure 1:
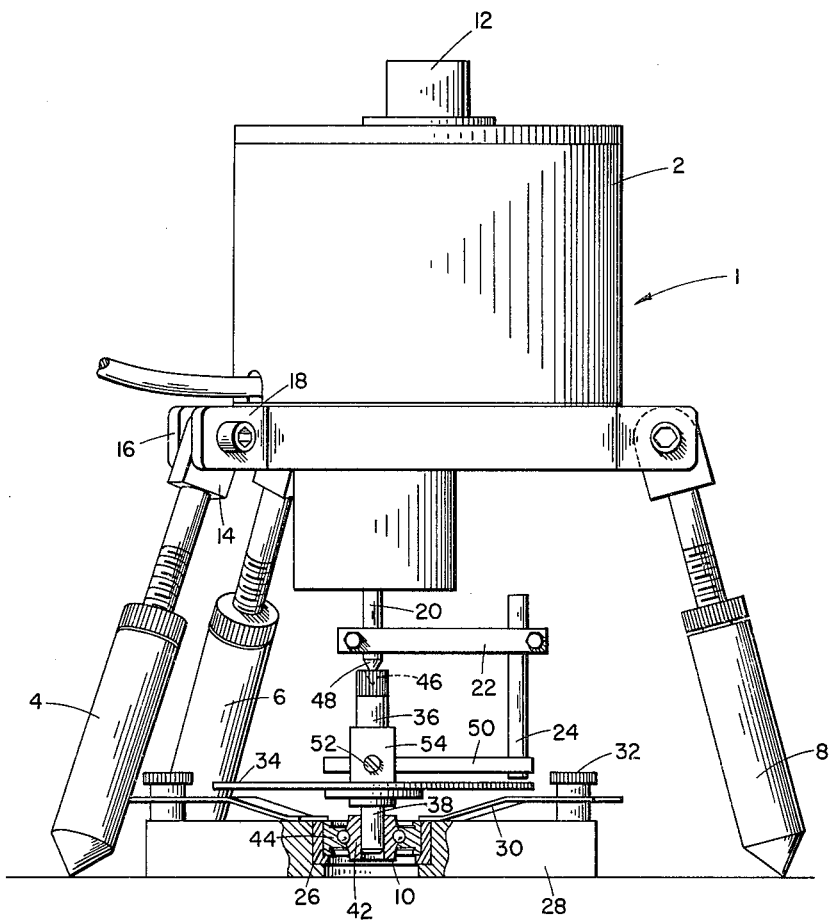

Sept. 14, 1965  A. D. SHAW  3,205,698

TORQUE MEASURING MEANS

Filed Dec. 18, 1962  2 Sheets-Sheet 1

INVENTOR.
ALEXANDER D. SHAW
BY
ATTORNEY

Sept. 14, 1965        A. D. SHAW        3,205,698

TORQUE MEASURING MEANS

Filed Dec. 18, 1962        2 Sheets-Sheet 2

INVENTOR.
ALEXANDER D. SHAW
BY
ATTORNEY

United States Patent Office 3,205,698
Patented Sept. 14, 1965

3,205,698
TORQUE MEASURING MEANS
Alexander D. Shaw, Manhattan Beach, Calif., assignor to North American Aviation, Inc.
Filed Dec. 18, 1962, Ser. No. 245,510
2 Claims. (Cl. 73—9)

This invention relates to means for determining the amount of torque required to overcome inertia and initial friction between two or more operatively related members, at least one of which is pivotable with respect to another, and the amount of torque required to cause such pivoting movement continuously after overcoming static inertia. More particularly, the invention disclosed herein is especially suited to measurement of minute torque values such as encountered in the inspection and testing of small bearing assemblies.

While the invention disclosed herein is widely applicable to inspection and testing of various devices such as, for example, gear trains, spiral type springs, or rotating type armatures in motors, generators and the like, it will be described for the sake of illustration in connection with inspection of bearing assemblies. In the prior art, friction or inertia of ball bearing assemblies are measured by a variety of devices which in a typical case may involve rotation of one bearing race relative to the other such race. This may be accomplished by application of rotational force either to the inner or the outer bearing race, while the remaining one is held stationary, and deflection of a spring is used to determine the amount of torque necessary to accomplish the stated relative rotation. However, devices known to the prior art lack the necessary accuracy, particularly at extremely low frictional values, to inspect or test bearings of the type modernly required in sensitive environments such as gyroscopes and electronic control systems in aerial and space vehicles. In such systems, the extreme reliability and performance guarantees for component parts requires testing in many cases of each and every bearing used throughout the system or vehicle. In view of the greater criticality which may involve bearing torque forces on the order of .015 inch-ounces, and the consistency of performance necessary in devices used to inspect large quantities of mass-produced bearing assemblies, devices known to the prior art lacking the necessary accuracy at low torque values, the necessary insensitivity to temperature over protracted periods of time, and the necessary adjustability or versatility are unsuitable. Accordingly, it is a principal object of the invention disclosed herein to provide means for measuring torque with great accuracy, particularly in the extremely low range of torque values.

It is a further object in this case to provide means for measuring torque values with consistent accuracy over protracted periods of time and throughout variations of environmental temperature.

It is a further object in this case to provide means as set forth in the above objects characterized by improved adjustability in measuring bearings or the like having various sizes.

It is an additional object of this invention to provide means as set forth in the above objects having improved versatility permitting measurement of torque in bearings or the like while installed in operative relationship in a mechanical system.

It is a further object of this invention to provide means as set forth in the above objects having improved accuracy and performance consistency throughout variations in the attitude or relationship of the measuring device relative to horizontal.

Figure 2:
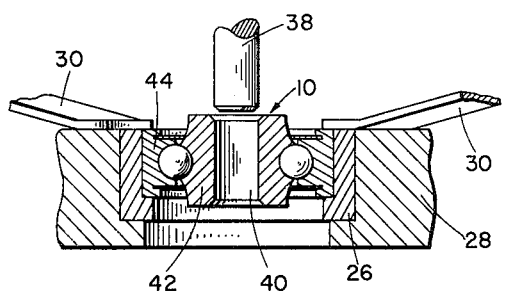
Figure 3:
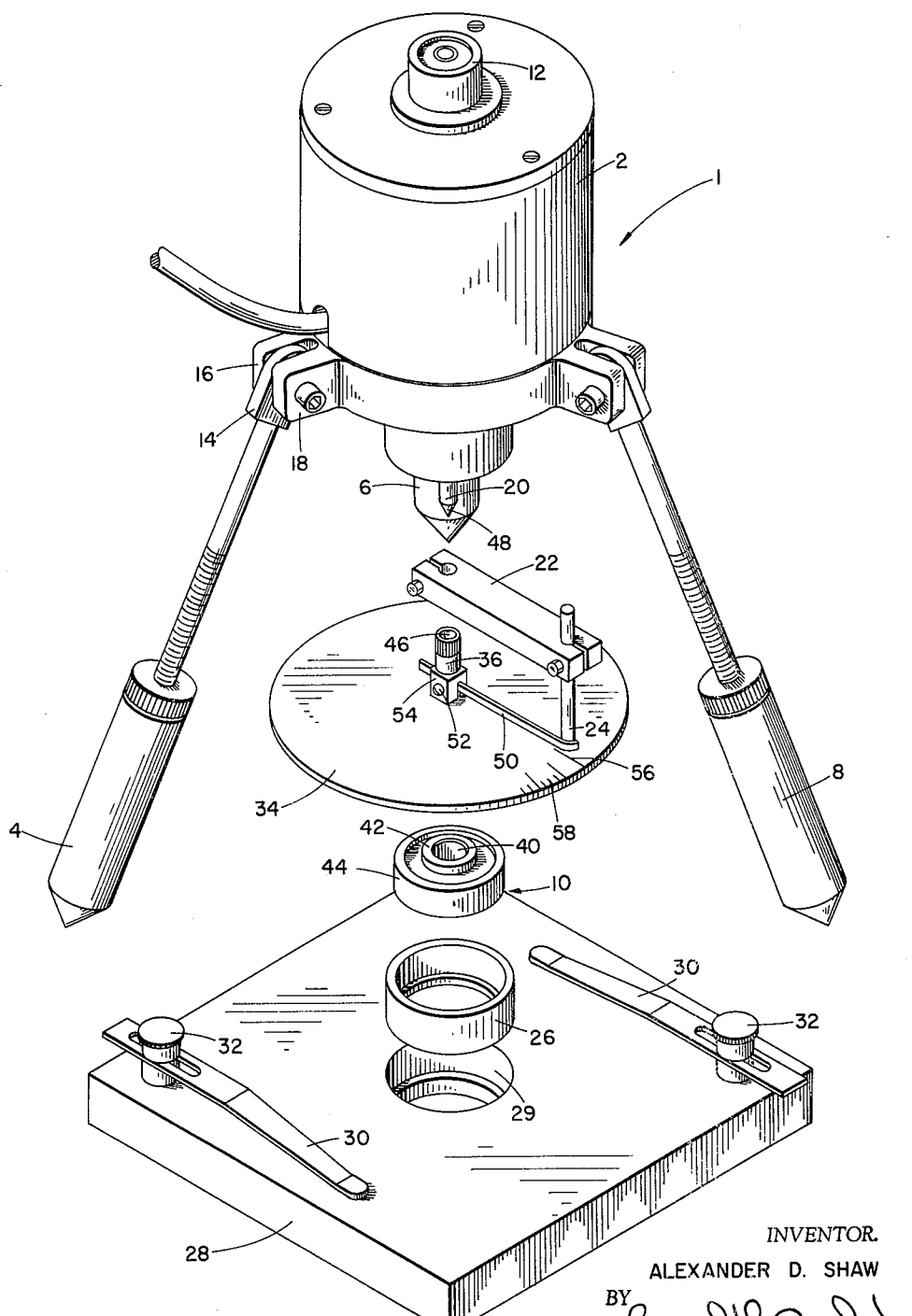

Other objects and advantages will become apparent upon a close reading of the following detailed description of an illustrative embodiment of the inventive concept, reference being had to the accompanying drawings, wherein:

FIGURE 1 shows a side elevational view, partly in cross section, of an illustrative embodiment of the inventive apparatus disclosed herein being used to test a bearing assembly, FIGURE 2 shows an enlarged detail of the bearing assembly of FIGURE 1 mounted for testing, and FIGURE 3 is a general perspective view of the structure shown in FIGURES 1 and 2, with various component parts separated from each other.

Referring to the drawings described above, and particularly to FIGURE 1, it may be seen that the invention disclosed herein comprises a torque testing device generally designated by reference numeral 1. Torque tester 1 comprises drive or force means which may take the form of a motor 2 supported by a plurality of adjustable supporting members 4, 6 and 8 for positioning motor 2 in alignment with an item to be tested, such as ball bearing assembly 10. Motor 2 is preferably constant speed such as achieved by synchronous A.C. motors. Suitable attitude indicating means may be provided to aid in positioning motor 2 in a desired attitude such as, for example, bubble type level indicator 12 mounted atop the housing for motor 2. The means for permitting adjustability of supports 4, 6 and 8 may take various conventional forms, such as rotatably mounting the lower portion of each support on a threaded upper portion and including jam nuts to hold the two stated portions in constant adjusted relationship with each other as shown by FIGURE 1. In addition the upper portion of each supporting member 4, 6 and 8 may be provided with a flange-like portion as indicated at 14 for pivotal mounting between two spaced-apart flanges as shown by 16 and 18 secured to the external housing of motor 2 as seen in FIGURE 1. An output shaft 20 extends from synchronous motor 2 and provides rotational force which is used to measure torque in a tested item as discussed in greater detail below. A force arm 22 is secured to shaft 20 and substantially normal to the axis of rotation of the shaft as shown by FIGURE 1. A second force arm 24 is in turn secured to force arm 22 and extends in a direction substantially parallel to the turning axis of shaft 20.

As seen more particularly from FIGURE 2, bearing assembly 10 during the testing thereof is mounted in a bushing or collar 26 which is adapted to fit within a recess or cavity 29 provided in a base 28 comprising holding means for bearing 10. Base 28 may be provided with retaining means such as one or more leaf springs as indicated at 30 pivotally mounted on suitable bearing supports such as 32 shown in FIGURE 1.

Torque tester 1 further comprises torque indicating and force transmitting means comprising a dial member 34 having calibrated scale markings on the face thereof and affixed to a shaft 36 which may be slightly tapered at its lower end 38 or otherwise adapted to fit tightly within the hollow center passage 40 of the inner race 42 of bearing assembly 10 and to rotate therewith while outer race 44 is held stationary within collar 26. The end of stub shaft 36 opposite from tapered portion 38 is provided with a hollow conical shaped cavity 46 which is adapted to receive the distal end of output shaft 20 which has an oppositely corresponding conical surface 48 for a purpose discussed in greater detail hereinbelow. Also, a leaf spring 50 is affixed to stub shaft 36 and may be releasably held in constant relationship thereto by suitable means such as a setscrew 52 extending through a threaded hole in housing portion 54 integrally formed on stub shaft 36. Thus, spring 50 is fully cantilevered with the point of attachment between spring 50 and shaft 36 lying substantially on the axis of rotation of inner race 42 of bearing assembly 10. Also, while leaf spring 50 is shown as having a slight hook shaped bend in the outer distal end thereof, the spring is substantially flat or straight between its point of attachment with shaft 38 and the point where force is applied by arm 24, and the stated curved portion of spring 50 may optionally be omitted.

Operation

Although the structure disclosed herein may be used for inspection or testing of various devices for different purposes, its operation need not differ materially from that described below for the sake of illustration. Operation of torque tester 1 may begin with placement of the item to be tested such as bearing assembly 10 in bushing or collar 26 which is selected according to the size or outer circumference of bearing assembly 10. Placement of assembly 10 within bushing 26 may be followed by placement of the bushing in base member 28 as shown, for example, by FIGURE 2, and by rotational movement of leaf springs 30 whereby the bushing and bearing contained therein are retained in cooperative relationship, and outer race 44 of bearing 10 is restrained from rotation during the test.

Thereafter, the testing procedure may continue by insertion of tapered portion 38 of stub shaft 36 within inner race 42 of the bearing assembly with sufficient force to prevent relative movement between shaft 36 and inner race 42 during the ensuing test procedure. Thereafter, motor 2 may be positioned over base member 28 so that conical surface 48 on shaft 20 is precisely aligned within or with respect to cavity 46, and thus is aligned with the axis of rotation of inner race 42 in the relationship generally shown by FIGURE 1, for example. Where base member 28 is positioned in a horizontal attitude so that the turning axis of inner race 42 of bearing assembly 10 is precisely vertical, the alignment of output shaft 20 from motor 2 in the stated relationship may be aided by variation in the adjustment of supporting members 4, 6 and 8 so that level indicator 12 assures that output shaft 20 is precisely vertical. Thereafter, the height of motor 2 is adjusted so that output shaft 20 does not touch stub shaft 36 and force arm 24 does not touch dial 34. Also, force arm 24 is positioned with respect to dial assembly 34, 36, 50 whereby the force arm lightly touches leaf spring 50 without applying any pressure thereto. With the parts assembled and positioned in the foregoing relationship, suitable power such as 110 volt 60 c.p.s. is supplied to motor 2 from an external source (not shown). Drive motor 2 may have a low speed such as one revolution per minute. Upon actuation of the motor, output shaft 20 will begin to rotate whereby rotational force will be transmitted through arms 22 and 24 so that the lower distal end of arm 24 applies force to leaf spring 50 tangentially with respect to the circle described by the point of contact between items 24 and 50 during rotational movement thereof, and at a point radially outwardly from the axis of rotation. As shown by FIGURE 3, arm 24 is preferably cylindrical at its point of contact with spring 50 whereby force is applied to the spring at a precisely measurable distance from the turning axis of shaft 36. Spring 50 will be deflected until the force applied to the spring by arm 24 becomes sufficient to overcome the inertia and friction effects of rotatable inner race 42 of bearing assembly 10, at which time the inner race, together with stub shaft 36, dial 34 and spring 50 will suddenly start to turn. Before such turning movement occurs, however, the initial application of force to leaf spring 50 by arm 24 will deflect spring 50 away from its undisturbed position representing zero torque as indicated by line 56 on dial 34 shown in FIGURE 3. Continued deflection of spring 50 may occur whereby the spring is aligned over one of the various other marks 58 on dial 34, the mark farthest away from index line 56 denoting the maximum torque measurable with dial 34. It will be understood by those skilled in the art that the initial application of force by arm 24 to spring 50 in the manner described above will cause deflection of spring 50 in an amount which increases to a maximum just before rotational movement of dial assembly 34, 36 and 50 occurs. When such rotational movement begins, spring 50 thereafter assumes a position relative to dial 34 indicative of a torque value slightly less than that indicated at the precise moment when rotational movement of dial 34 begins. The explanation for this is that the initial or so-called break-out force necessary to overcome inertia and friction in a rotating member is normally greater than the amount of torque necessary to continue operation. In consequence, the break-out force of bearing 10 is that amount indicated by spring 50 on dial 34 at the instant when rotation of dial 34 begins, which normally will also be the maximum torque value achieved throughout the test of any particular bearing. After rotational movement of dial 34 occurs, the so-called running torque, comprising that rotational force necessary to continue rotation of dial 34 and parts turning therewith, remains substantially constant and is directly readable by noting the relative position of spring 50 in respect to marks 58 on dial 34 during movement of the dial by constant force applied by operation of motor 2. It will be further understood by those skilled in the art that dial 34 and spring 50 must be calibrated so that deflection of spring 50 may be properly interpreted from alignment of spring 50 over marks 58.

The device disclosed above and in the drawings has been found from extensive testing and use thereof to result in extreme accuracy at the particularly sensitive low torque ranges and for the periods of time necessary to test large quantities of mass-produced bearing assemblies. This improved accuracy results in part from the fact that turning force to cause rotation of the tested item is not applied by human hands but instead by a constant speed synchronous motor. Thus, it has been found that devices known to the prior art for measurement of torque forces in the extremely low range involving manual movement gave different readings when such devices were operated by different individuals. Such inconsistency in the use of convenitonal torque measuring devices appeared to result at least in part from variations in the speed or the suddenness with which torque was applied to the tested bearing by different human operators. In addition to the advantages of using a constant speed motor which applies force at the same rate and in the same manner regardless of use by different human operators, incorporation of leaf spring 50 to measure torque instead of a spiral spring appears to provide greater accuracy and consistency in spring performance. Thus, a spiral spring does not produce consistent torque readings in the extremely low range. Moreover, spiral springs are extremely sensitive to slight variations in temperature, whereby they lack stable performance characteristics. Improved accuracy in the device disclosed herein also results from the fact that there is absolutely no friction load added to that of the tested item in the torque indications produced by spring 50. Thus, all of the torque applied to dial assembly 34, 36, 50 and inner race 42 of bearing assembly 10 is transmitted from arm 24 directly to the inner race without any possibility of erroneous indications by spring 50. It is due to the same characteristics and features just described that the inventive apparatus disclosed herein is particularly well adapted for use in measuring extremely small values of torque for long periods of time such as involved in testing vast quantities of parts. In this connetcion, this invention provides great versatility in respect to variations in the size of tested parts. For example, a plurality of bushings 26 having different inner diameters to accommodate different sizes of bearing assemblies 10 may be used within a single base member 28, and a plurality of different stub shaft portions 38 may be provided to accommodate different sizes of bearing inner races 42 without replacement of any other parts in torque tester 1. Improved versatility in torque tester 1 also results from the fact that it may be used to test bearings which are installed in mechanical systems in precise operative relationship therewith. Thus, where a bearing assembly 10 such as shown by FIGURE 3, for example, is installed in a mechanical system providing sufficient access for the purpose, base member 28 and bushing 26 may be dispensed with and dial assembly 34, 36 and 50 may be operatively related to bearing assembly 10 for test purposes in precisely the same manner discussed above except for the absence of items 26 and 28. Even where the rotating axis of a bearing assembly 10 is horizontal instead of vertical, it has been found that dial assembly 34, 36 and 50, which may be fabricated from extremely lightweight materials, lacks sufficient mass to produce any significant errors in torque indications due to thrust loads or nonuniform loading of the tested item. In this connection, it is of further importance that torque tester 1 applies no significant loads whatsoever to bearing assembly 10 during the testing thereof in the manner described above and shown in the drawings. Devices known to the prior art which apply thrust loads to the bearings have been found to produce inconsistent torque indications due apparently to variations in rotational characteristics of a bearing when axial or lateral forces are applied thereto in addition to rotational force.

While the particular structural details set forth above and in the drawings are fully capable of attaining the objects and providing the advantages herein stated, the structure and method thus disclosed are merely illustrative and could be varied or modified to produce the same results without departing from the scope of the inventive concept as defined in the appended claims.

I claim:

1. In apparatus for measuring the resistance to movement between the first element rotatably movable relative to a second element, the combination of:

lightweight dial means including a dial face and means for releasably supporting said dial means entirely on said first element for rotation therewith, said dial means further including an elongate leaf spring secured at one end thereof to said dial means substantially at the turning axis of said rotational movement and extending radially outwardly from said turning axis, restraining means for preventing rotational movement of said second element during said relative movement of said first element, driving means comprising a constant speed motor and force transmitting means operatively connecting said motor to said leaf spring for applying force to said leaf spring at a predetermined distance from said turning axis to cause deflection of said spring relative to said dial face and to further cause said relative movement of said first element, adjustable support means for supporting said motor with the motor axis of rotation in alignment with said turning axis of said first element, and attitude indicating means mounted on said motor for indicating said condition of alignment.

2. In apparatus for measuring torque resistance of a rotatable part comprising a bearing assembly having an inner and outer race separated by a plurality of low friction elements permitting relative rotational movement of said inner and outer races with respect to each other, the combination of:

support means including a bushing for supporting said outer race in a relatively stationary state, lightweight dial means attachable to said inner race and rotatable therewith, said dial means including a dial face with a graduated scale thereon and provided with a stub shaft adapted to fit within said inner race and to rotate therewith, said dial means further including a flat spring cantilever mounted proximate the center of rotation of said dial means and extending radially outwardly from said center, and force means for applying force to said flat spring at a predetermined distance from said center to cause deflection of said spring with respect to said dial face and tending to cause rotation of said dial means, whereby the torque resistance of said part is indicated on said scale by deflection of said spring.

References Cited by the Examiner

UNITED STATES PATENTS 2,091,022 8/37 Stuart _____ 73—9
2,519,378 8/50 Kilpatrick _____ 73—59
2,736,195 2/56 Christianson _____ 73—59 X

FOREIGN PATENTS 171,191 4/60 Sweden.

RICHARD C. QUEISSER, *Primary Examiner.*
ROBERT L. EVANS, *Examiner.*